Patented May 17, 1927.

1,628,970

UNITED STATES PATENT OFFICE.

CHRISTIAN B. HAGER, OF MARSHALLTOWN, IOWA.

COMPOSITION FOR WASHING CLOTHES OR OTHER FABRICS.

No Drawing.   Application filed June 8, 1920.   Serial No. 387,433.

The object of my invention is to provide a preparation or composition made up of certain ingredients which when placed in water will act as a cleanser for cleaning foreign matter out of clothes or the like.

A further object is to provide a cleanser, which is preferably put up in powder form.

In the preparation of my composition the various ingredients are pulverized and are thoroughly mixed with each other.

The proportions of the ingredients may be varied, but I preferably use the following proportions:

|  | Per cent. |
|---|---|
| Fire clay | 77 |
| Salt (sodium chloride) | 20 |
| Chloride of lime ($CaOCl_2$) | 2¾ |
| Ultramarine blue | ¼ |

The fire clay cuts and removes the grease from the clothing, the salt increases the specific gravity of the water. The chloride of lime, which serves as a bleacher, whitens the clothes and the ultramarine blue gives the clothes the color desired.

When the entire number of ingredients are mixed in the proportions above referred to and placed in water, any grease or foreign matter in the clothes will be taken out, while the coloring and bleaching caused by the use of the various ingredients above referred to, will cause the clothes to become thoroughly cleansed.

One of the advantages of my composition is in the fact that it comes in powdered form and may be made very cheaply. The composition may be packed in small packages or shipped in large cases, the contents being such that they will always retain their original strength. All of the ingredients used are common elements, which are easily accessible and are not expensive.

I have obtained satisfactory results in the use of my compound by using one pound of the compound to ten gallons of water.

I claim as my invention:

1. A composition for washing clothes or other fabrics, consisting of fire clay, sodium chloride, chloride of lime, and ultramarine blue.

2. A composition for washing clothes or other fabrics, consisting of the following ingredients in substantially the following proportions:

|  | Per cent. |
|---|---|
| Fire clay | 77 |
| Sodium chloride | 20 |
| Chloride of lime | 2¾ |
| Ultramarine blue | ¼ |

CHRISTIAN B. HAGER.